(12) United States Patent
Cracco et al.

(10) Patent No.: US 9,377,101 B2
(45) Date of Patent: Jun. 28, 2016

(54) METHOD FOR ELECTRONICALLY CONTROLLING A BICYCLE GEARSHIFT AND ELECTRONICALLY SERVO-ASSISTED BICYCLE GEARSHIFT

(71) Applicant: Campagnolo S.r.l., Vicenza (IT)

(72) Inventors: Flavio Cracco, Vicenza (IT); Andrea De Pretto, Piovene Rocchette—VI (IT)

(73) Assignee: Campagnolo S.r.l., Vicenza (IT)

( * ) Notice: Subject to any disclaimer, the term of this patent is extended or adjusted under 35 U.S.C. 154(b) by 62 days.

(21) Appl. No.: 14/177,545

(22) Filed: Feb. 11, 2014

(65) Prior Publication Data

US 2014/0224055 A1  Aug. 14, 2014

(30) Foreign Application Priority Data

Feb. 12, 2013  (IT) ................................ MI2013A0193

(51) Int. Cl.
  *F16H 59/04* (2006.01)
  *B62M 25/08* (2006.01)
  *B62K 23/06* (2006.01)
  *F16H 59/02* (2006.01)

(52) U.S. Cl.
  CPC .............. *F16H 59/044* (2013.01); *B62K 23/06* (2013.01); *B62M 25/08* (2013.01); *F16H 2059/0239* (2013.01); *Y10T 74/2003* (2015.01)

(58) Field of Classification Search
  None
  See application file for complete search history.

(56) References Cited

U.S. PATENT DOCUMENTS

| 6,216,078 | B1 * | 4/2001 | Jinbo | ..................... B62K 23/06 188/24.11 |
| 6,679,797 | B2 | 1/2004 | Valle | |
| 2006/0213311 | A1 * | 9/2006 | Ose | ........................ B62K 23/06 74/502.2 |
| 2007/0175290 | A1 * | 8/2007 | Fujii | ...................... B62K 23/02 74/502.2 |
| 2009/0031841 | A1 * | 2/2009 | Tetsuka | .................. B62K 23/06 74/473.12 |
| 2010/0244401 | A1 * | 9/2010 | Hara | ...................... B62M 9/122 280/261 |
| 2013/0192407 | A1 * | 8/2013 | Fujii | ...................... B62M 25/08 74/491 |
| 2014/0053675 | A1 * | 2/2014 | Tetsuka | .................. B62M 25/08 74/473.13 |
| 2014/0058578 | A1 * | 2/2014 | Tetsuka | ..................... B62L 3/02 701/1 |
| 2015/0203169 | A1 * | 7/2015 | Nishino | ................. B62K 23/06 74/491 |

FOREIGN PATENT DOCUMENTS

| EP | 1964763 A1 | 9/2008 |
| EP | 2020371 A1 | 2/2009 |
| WO | 2007083331 A1 | 7/2007 |

OTHER PUBLICATIONS

Italian Search Report and Written Opinion in Italian Application No. IT MI2013A000193, Oct. 4, 2013 with English translation.

* cited by examiner

*Primary Examiner* — Justin Holmes
(74) *Attorney, Agent, or Firm* — Volpe and Koenig, P.C.

(57) ABSTRACT

A device (42, 50, 70, 75, 80, 85) for manually inputting commands for an electronically servo-assisted bicycle gearshift (8) comprises a lever (54, 86) configured to actuate a first switch (60) when it is rotated by a first predetermined angle, and to actuate the first switch (60) and a second switch (61) when it is rotated by a second predetermined angle after the rotation by the first predetermined angle. A command input requesting gearshifting in a first direction is considered to be valid when only the first switch (60) is actuated, and a command input requesting gearshifting in a second direction is considered to be valid only when both of the switches (60, 61) are actuated.

11 Claims, 11 Drawing Sheets

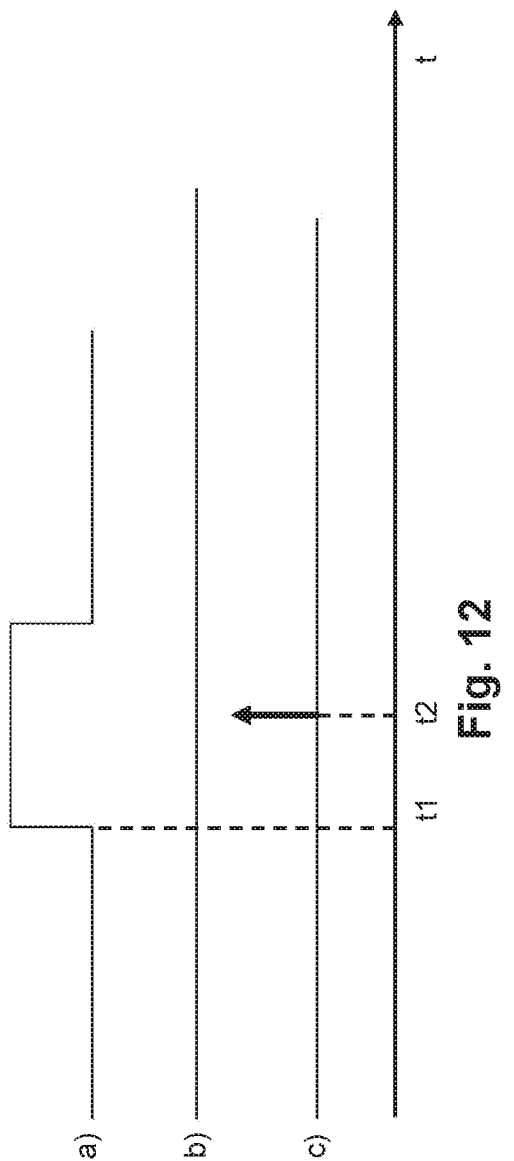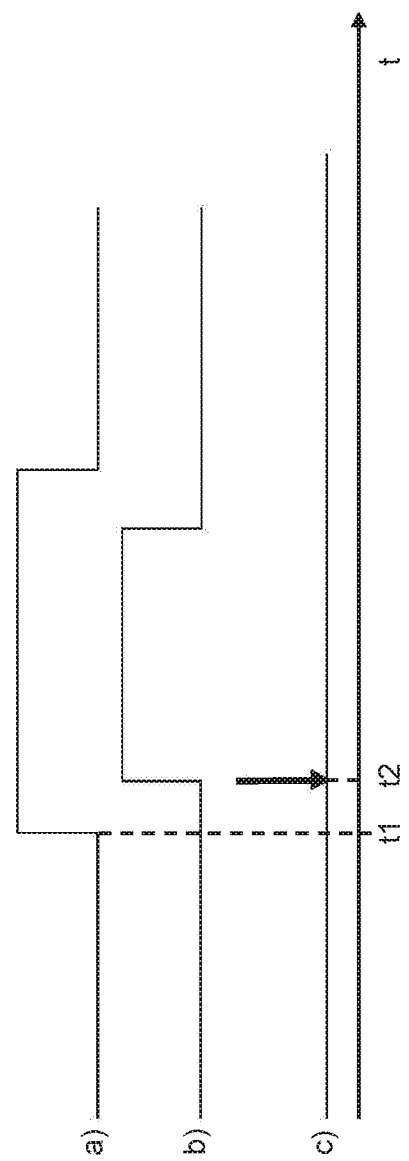

METHOD FOR ELECTRONICALLY CONTROLLING A BICYCLE GEARSHIFT AND ELECTRONICALLY SERVO-ASSISTED BICYCLE GEARSHIFT

CROSS REFERENCE TO RELATED APPLICATION

This application claims the benefit of Italian Application No. MI2013A000193, which was filed on Feb. 12, 2013, and is incorporated herein by reference as if fully set forth.

FIELD OF INVENTION

The present invention relates to a method for electronically controlling a bicycle gearshift, and to an electronically servo-assisted bicycle gearshift, in particular a device thereof for manually inputting commands.

BACKGROUND

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur are provided for. In the case of an electronically servo-assisted gearshift, each derailleur comprises a chain guide element, also known as cage, movable to move the chain among the toothed wheels in order to change the gear ratio, and an electromechanical actuator to move the chain guide element. The actuator in turn typically comprises a motor, typically an electric motor, coupled with the chain guide element through a linkage such as an articulated parallelogram, a rack system or a worm screw system, as well as a sensor of the position, speed and/or acceleration of the rotor or of any moving part downstream of the rotor, down to the chain guide element itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or, of particular interest for the present invention, based on commands manually input by the cyclist through suitable control members, for example levers and/or buttons.

By convention, downward gearshifting is said when the chain passes from a toothed wheel of greater diameter to a toothed wheel of smaller diameter, and upward gearshifting when the chain moves from a toothed wheel of smaller diameter to a toothed wheel of greater diameter. Concerning this, it should be noted that in a front gearshift group, downward gearshifting corresponds to passing to a lower gear ratio and upward gearshifting corresponds to the passage to a higher gear ratio; vice-versa in a rear gearshift group, downward gearshifting corresponds to the passage to a higher gear ratio and upward gearshifting corresponds to the passage to a lower gear ratio.

A device for controlling the front derailleur and a device for controlling the rear derailleur—or only one of the two in the case of simpler gearshifts—are mounted so as to be easily maneuvered by the cyclist, normally on the handlebars, close to the handgrips thereof where the brake lever is also located for controlling the brake of the front and rear wheel, respectively. Control devices that allow to drive both a derailleur in the two directions and a brake are commonly called integrated controls.

By convention, the control device of the front derailleur and the brake lever of the front wheel are located close to the left handgrip, and vice-versa the control device of the rear derailleur and the brake lever of the rear wheel are located close to the right handgrip.

During travel, there is sometimes a need (detected by electronics or by the cyclist) or a wish of the cyclist to carry out multiple gearshifting, in other words to move the chain from the toothed wheel (of the rear or front gearshift group) with which it is engaged—or starting gear wheel—to a toothed wheel not immediately adjacent thereto, having a greater diameter (multiple upward gearshifting) or having a smaller diameter (multiple downward gearshifting).

WO 2007/083331 A1 discloses a mechanical bicycle gearshift that allows manual input of upward and downward gearshifting commands through the manual actuation of a single lever in a same direction, by two different angles of rotation.

The technical problem at the basis of the invention is to provide a method for electronically controlling a bicycle gearshift, and an electronically servo-assisted bicycle gearshift that allow manual input of upward and downward gearshifting commands through the manual actuation of a single lever in a same direction, by two different strokes (different angles of rotation).

SUMMARY OF THE INVENTION

In one aspect thereof, the invention relates to a device for manually inputting commands for an electronically servo-assisted bicycle gearshift, comprising a lever configured to actuate a first switch when it is rotated by a first predetermined angle, and to actuate the first switch and a second switch when it is rotated by a second predetermined angle after the rotation by the first predetermined angle.

In embodiments, said lever is pivoted on a shaft, a first hammer for actuating the first switch being fitted onto the shaft and projecting at a radial, a second hammer for actuating the second switch being coupled with the shaft through a gear to project at a different radial direction.

In the present description and in the attached claims, under "radial direction", a line or direction originating from the centre of the rotation axis or shaft is meant.

Said gear can comprise a pair of gear wheels or a planetary gear.

In embodiments, said lever is pivoted on a shaft, a projection is fitted onto the shaft projecting at a radial, and said projection has a first hammer for actuating the first switch a first distance from the shaft and a second hammer for actuating the second switch a second distance from the shaft.

In embodiments, said lever is pivoted on a shaft, a projection is fitted on the shaft projecting at a radial and has a first hammer for actuating the first switch, an elastic membrane being arranged between the first switch and the second switch.

In embodiments, said lever is pivoted on a second lever, said first switch being fixed on said second lever under said lever to be actuated by it, and a projection is fitted onto the shaft projecting at a radial and has a second hammer for actuating the second switch.

Preferably, each of said first and second hammers is equipped with a respective elastic actuation element, more preferably comprising a stud received in a compression spring.

The switches are preferably monostable, more preferably they are normally open switches.

In an aspect thereof, the invention relates to an electronically servo-assisted bicycle gearshift comprising at least one device for manually inputting commands as stated above, and a controller configured to consider a command input requesting gearshifting in a first direction to be valid when only the first switch is actuated, and to consider a command input requesting gearshifting in a second direction to be valid when both of the switches are actuated.

In embodiments, said controller considers a command input requesting gearshifting in the first direction to be valid when the first switch is deactivated without the second switch having been activated—during the activation of the first switch—, and considers a command input requesting gearshifting in the second direction to be valid when the second switch is deactivated—during the activation of the first switch—, ignoring the subsequent deactivation of the first switch.

In embodiments, said controller considers a command input requesting gearshifting in the first direction to be valid when the first switch stays activated for a predetermined time period without the second switch having been activated, and considers a command input requesting gearshifting in the second direction to be valid when the second switch is activated after the activation of the first switch, before said predetermined time period has passed.

In an aspect thereof, the invention relates to a method for electronically controlling a bicycle gearshift, comprising the steps of:

a) providing a device for manually inputting commands having a lever configured to actuate a first switch when it is rotated by a first predetermined angle, and to actuate the first switch and a second switch when it is rotated by a second predetermined angle after the first predetermined angle, and b) considering a command input requesting gearshifting in a first direction to be valid when only the first switch is actuated, and considering a command input requesting gearshifting in a second direction to be valid when both of the switches are actuated.

BRIEF DESCRIPTION OF THE DRAWINGS

FIGS. 12 and 13 are schematic time charts illustrating the operation of the electronic gearshift controlled according to the flow chart of FIG. 8.

DETAILED DESCRIPTION OF THE PREFERRED EMBODIMENT(S)

Figure 1:
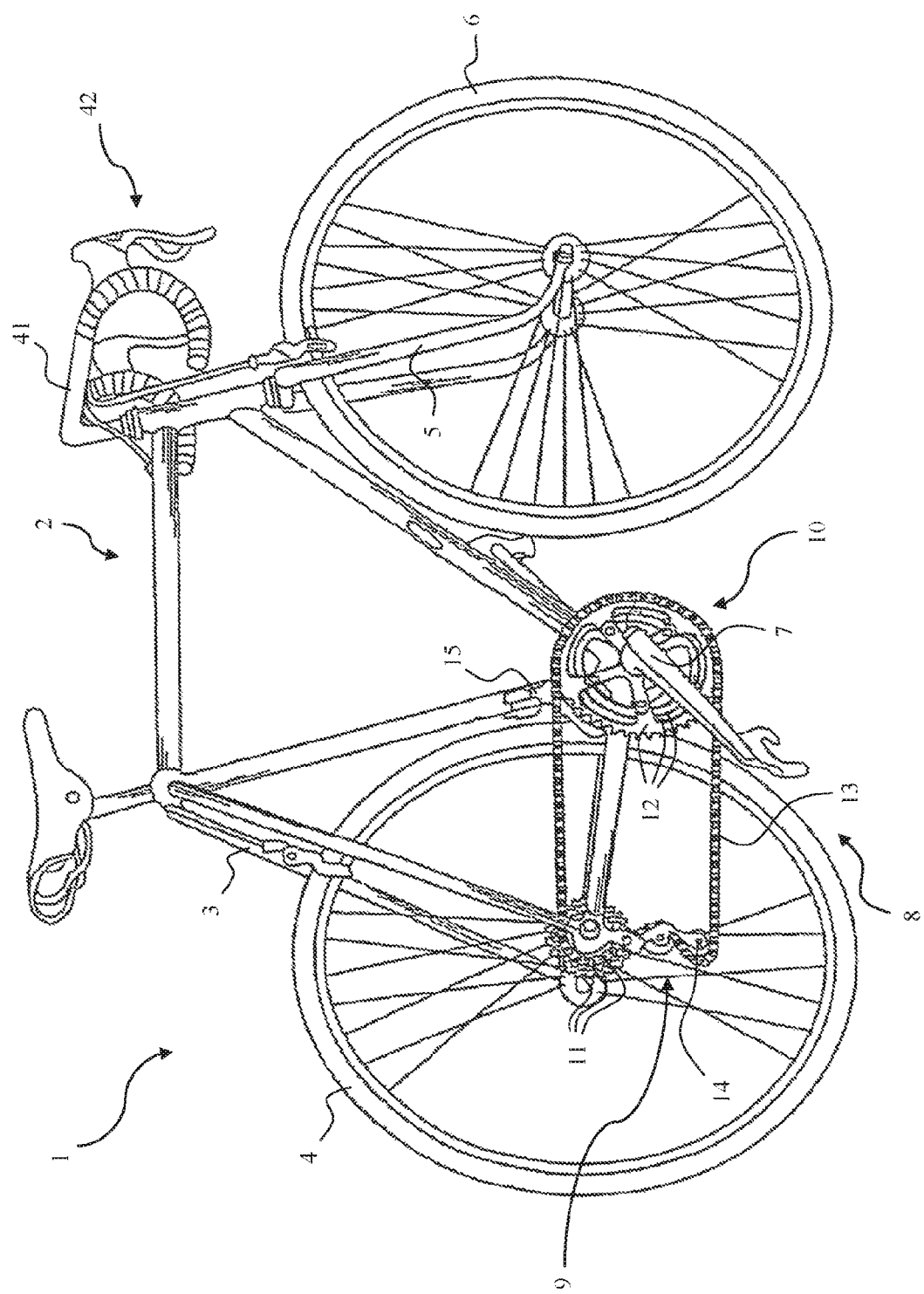
FIG. 1 schematically illustrates a perspective view of a bicycle equipped with an electronically servo-assisted gearshift according to the present invention.

With reference to FIG. 1, a bicycle 1, shown here as a racing bicycle, includes a frame 2 formed in a known way of tubular elements defining a bearing structure 3 for a rear wheel 4 and a fork 5 for a front wheel 6. Handlebars 41 having a tubular structure are operatively connected to the fork 5 and to the frame 2.

The frame 2, at its lower portion, bears an axle of the pedal cranks or pedal units 7, of the conventional type, to actuate the rear wheel 4 through an electronically servo-assisted gearshift according to the invention, indicated in general with reference numeral 8.

The gearshift 8 comprises a rear gearshift group 9 and a front gearshift group 10. The rear gearshift group 9 includes a plurality of toothed wheels or sprockets 11 having different diameters and coaxial with the rear wheel 4. The front gearshift group 10 includes a plurality of toothed wheels or crowns or gearwheels 12, having different diameters and coaxial with the axle of the pedal cranks 7.

The toothed wheels 11 of the rear gearshift group 9 and the toothed wheels 12 of the front gearshift group 10 can be selectively engaged by a closed loop motion transmitting chain 13, to provide the different gear ratios available, through the electronically servo-assisted gearshift 8.

The different gear ratios can be obtained by moving a chain guide element (cage) of a rear derailleur 14 of the rear gearshift group 9 and/or a chain guide element (cage) of a front derailleur 15 of the front gearshift group 10.

In the respective derailleur 14, 15, the rear chain guide element and the front chain guide element are moved by a respective electric motor 16, 17 (FIG. 2), typically equipped with a reducer and associated with the chain guide element through an articulated parallelogram linkage. Alternatively, it is possible to use other types of motor or other types of actuator or linkage that are well known in the art, for example a rack or worm screw system, for example the one described in U.S. Pat. No. 6,679,797, which is incorporated herein by reference.

Figure 2:
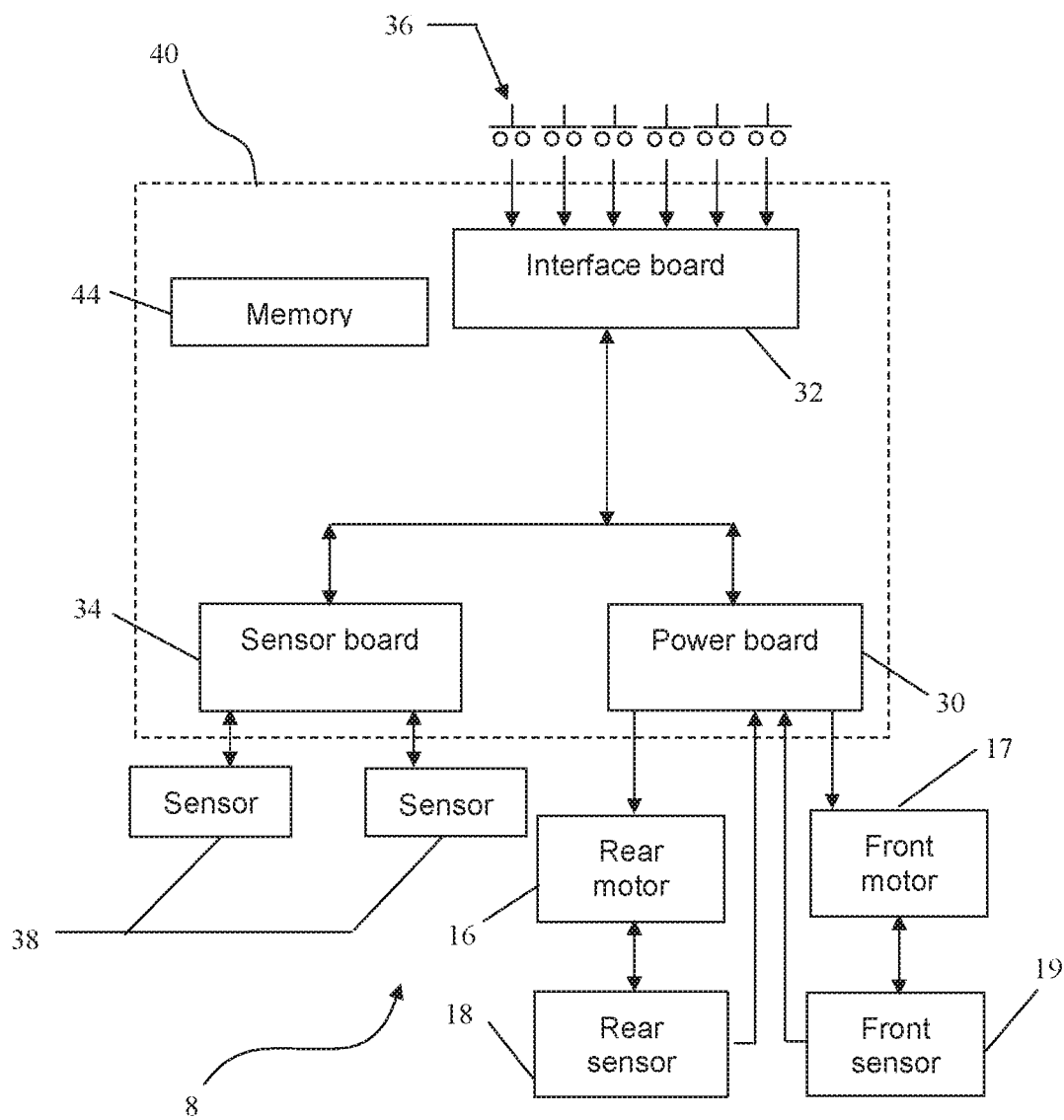
FIG. 2 illustrates a block diagram of the electric and electronic part of the electronically servo-assisted gearshift according to an embodiment of the present invention.

The derailleurs 14, 15 typically comprise a respective position, speed and/or acceleration sensor 18, 19 (FIG. 2). The sensor can be associated with the rotor of the motor 16, 17, or with any mobile part "downstream" of the rotor, down to the chain guide element itself.

The details of the construction of the derailleurs 14, 15 are not illustrated here since the present invention lies outside their specific construction.

FIG. 2 represents, in the form of a block diagram, the electric and electronic part of the electronically servo-assisted gearshift according to an embodiment of the present invention.

An electronic unit power or board or unit 30, equipped with a battery, supplies the electric power to the motors 16, 17 and to the sensors 18, 19 of the derailleurs 14, 15, to an electronic board referred to hereinbelow as interface board or unit 32, and possibly to an electronic board referred to hereinbelow as sensor board or unit 34. The battery is preferably of the rechargeable type, and the rear derailleur 14 can include, in a per se known way, a dynamo-electric unit to recharge the battery. In FIG. 2, the power supply lines are not shown for the sake of simplicity.

The electronic power board 30, the interface unit 32 and the sensor unit 34 as a whole form an electronic controller or control electronics 40 of the electronically servo-assisted gearshift 8. Alternatively, there can be a single electronic board or a different number of electronic boards.

In the present description and in the attached claims, therefore, under electronic controller or control electronics 40 a logic unit shall be meant, which can however be formed of many physical units, in particular of one or more distributed microprocessors that can be contained for example in the electronic power board 30, in the interface unit 32 and/or in the sensor unit 34.

The electronic power board 30 is housed for example in one of the tubes of the handlebars 41 or in one of the tubes of the frame 2, for example at a support for a drinking bottle (not illustrated). The interface unit 32 is housed for example in one of the tubes of the handlebars 41 or in a grippable device or device for manually inputting commands or manual control device 42 mounted on it. The sensor board 34 is housed for example in one of the tubes of the frame 2, close to sensors 38 of travel parameters associated with such a sensor board 34 or more generally with the electronic controller 40, such as sensors of travel speed, of rotation speed of the pedal cranks, of slope of the terrain, of heart rate of the cyclist and the like.

The transfer of power, data and information among the various components is carried out through electric cables, advantageously housed inside the tubes of the frame 2. The transfer of data and information signals can also take place in wireless mode, for example with Bluetooth protocol.

During travel, the rear and front derailleurs 14, 15 are controlled by the electronic controller 40 based on upward or downward gearshifting request signals entered by the manual control devices 42, and/or semiautomatically or automatically by the electronic controller 40 itself.

The following description of a grippable device or device for manually inputting commands or manual control device 42 is made with reference to a right device, intended to be mounted close to the right handgrip of the handlebars, but it is manifest that a left device intended to be mounted close to the left handgrip of the handlebars will be analogous and the mirror-image of the one shown.

Figure 3:
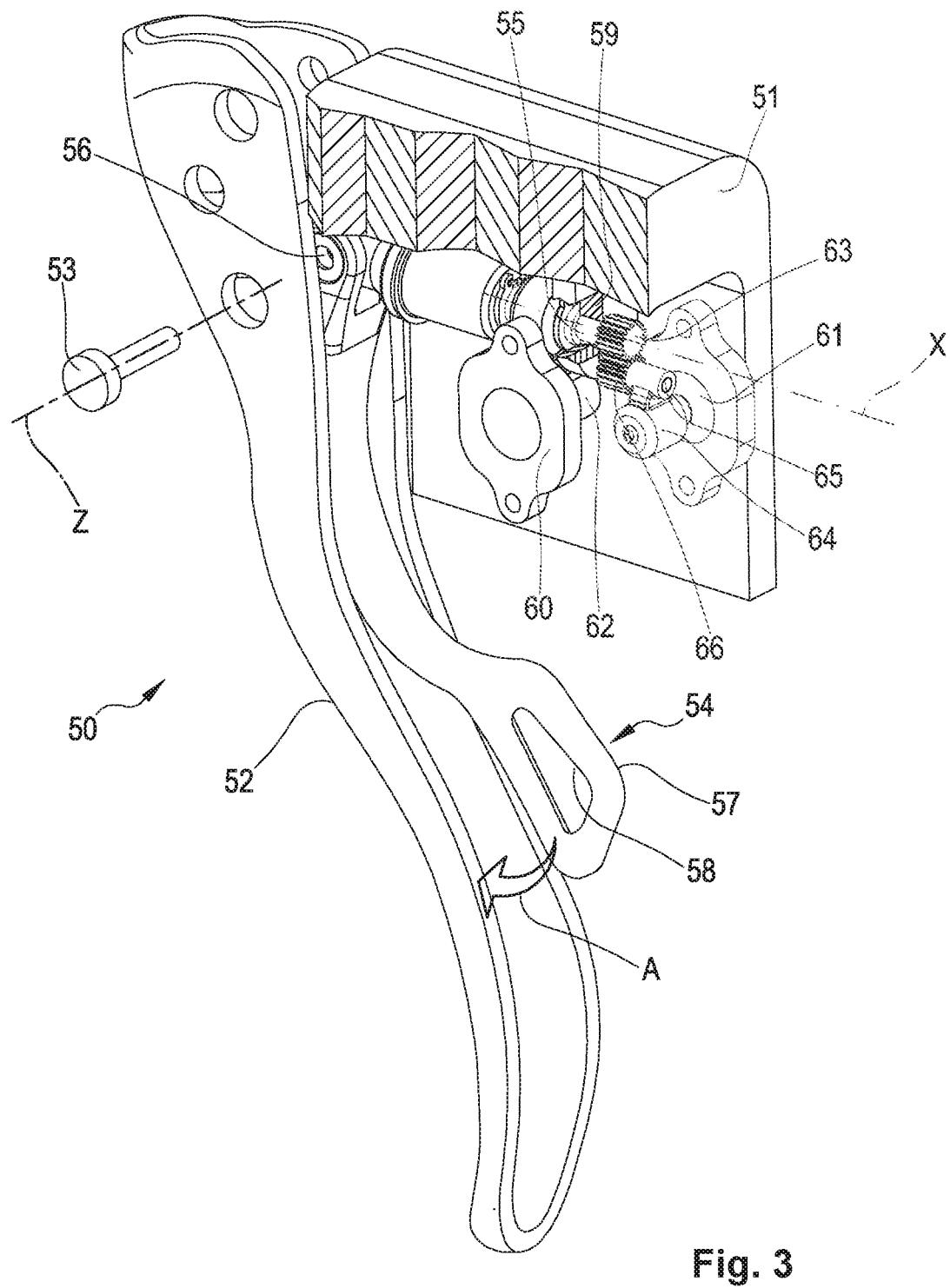
FIGS. 3 to 7 illustrate embodiments of a device for manually inputting commands of the gearshift according to the invention.

A control device 42 (FIG. 2) according to an embodiment schematically shown in FIG. 3 and globally indicated therein with reference numeral 50 comprises a body 51 (shown schematically and partially cut away in FIG. 3) to be fixed frontally of a curved handgrip portion of the handlebars 41 through known connection means, for example through a strap, and frontally projecting from the handlebars 41 (FIG. 1).

In the present description and in the attached claims, the spatial terms, in particular the terms front, rear, upper, lower and vertical and derivatives, are used with reference to the mounted condition of the control device, and with reference to the handlebars in neutral position, the term inner or proximal indicates towards the centre of the handlebars, while the term outer or distal indicates away from the centre of the handlebars.

The support body 51 is typically coated with a protective sheath (not shown) and is so shaped as to be able to be gripped by the cyclist, with the palm of his/her hand resting on its upper wall. In a different riding position, the cyclist instead grips the handlebars 41 below the support body 51. In both riding positions, the cyclist can easily reach both a brake lever 52 and a gearshift lever 54 with his/her fingers.

In the support body 51 an internal cavity is defined where two electric switches 60, 61 are housed, actuated by the gearshift lever 54 through a mechanism now described.

In the front region of the support body 51, the brake lever 52 extends downwards and is pivoted at the top about a pin 53 defining an axis Z that is substantially horizontal and substantially perpendicular to the direction of forward motion of the bicycle. The head of a traction cable (not shown) is connected, in a known manner, to the brake lever 52 to actuate the brake when the brake lever 52 is pulled by the cyclist towards the handlebars 41, typically with plural fingers of the hand other than the thumb.

In the front region of the support body 51, behind the brake lever 52, there is also the gearshift lever 54, extending downwards and coupled with a shaft 55 supported in the support body 51 rotatable to rotate about a rotation axis X, the rotation axis X being substantially parallel to the direction of forward motion of the bicycle.

The gearshift lever 54 extends behind and along the brake lever 52, and is articulated about a pin 56 fixed to the shaft 55 to follow the movement of the brake lever 52 through a rotation about an axis parallel to the axis Z.

The gearshift lever 54 comprises an actuation portion 57 that is enlarged and preferably equipped with an aperture 58, suitable to receive a finger, preferably the middle or ring finger, in abutment on the distal side and to be pushed in the proximal direction or vice-versa.

The gearshift lever 54 is capable, in addition to the movement towards the handlebars 41 with the brake lever 52 about the pin 56, of a movement in a direction of rotation about the axis X of the shaft 55, to control, in a way better described hereinafter, an upward gearshifting switch 60 and a downward gearshifting switch 61 and therefore impart upward gearshifting and downward gearshifting commands, respectively (or vice-versa). The switches are preferably of the membrane type.

In detail, the shaft 55 is supported for example in a hole (provided with a possible bearing) of a partition wall 59 of the support body 51. A distal end of the shaft 55 supports the gearshift lever 54 through the pin 56. Along the length of the shaft 55 a first annular element is fitted, having a first hammer 62 projecting at a tangential position of the annular element. At a proximal end of the shaft 55 a first gear wheel 63 is made. A second hammer 64 is rotatably supported about a shaft 65 parallel to the shaft 55 and provided with a second gear wheel 66. The second gear wheel 66 engages with the first gear wheel 63 to rotate in an opposite rotation direction. The switches 60, 61 are supported on inner faces of opposite walls of the support body 51. The hammers 62, 64 are provided with elastic actuation elements, such as studs inserted into and acting against compression springs (see FIG. 5 described hereinafter).

When the gearshift lever 54 is in a rest position, wherein it is biased by a torsion spring not shown, the two hammers 62, 64 are spaced from the switches 60, 61 or in contact therewith, but do not actuate them. The switches 60, 61 are in the stable condition, not activated. When the gearshift lever 54 is turned in a direction A about the axis X, for example in the clockwise direction from the rest position into a more proximal position, the rotation of the shaft 55 causes the rotation of the first hammer 62 in direction A, and the actuation of the first switch 60. Meanwhile, the rotation of the shaft 55 also causes the rotation of the first gear wheel 63 in one direction, clockwise in the example, the rotation of the second gear wheel 66 in the opposite direction, counter-clockwise in the example, and the rotation of the second hammer 64 towards the second switch 61. The second hammer 64 is mounted with respect to the shaft 65 along such a radial direction, with respect to the first hammer 62, that the second hammer 64 does not actuate the second switch 61 as soon as the first hammer 62 actuates the first switch 60. Conversely, a greater rotation of the gearshift lever 54 in direction A about the axis X is necessary so that the second hammer 64 actuates the second switch 61. It should be noted that during the entire additional rotation of the gearshift lever 54 to actuate the second switch 61 through the second hammer 64, the first switch 60 stays actuated through the first hammer 62.

When the gearshift lever 54 is released, the second switch 61 is deactivated before the first switch 60. If the gearshift lever 54 is actuated by a rotation by a comparatively small angle, on the other hand, only the first switch 60 is actuated.

Figure 4:
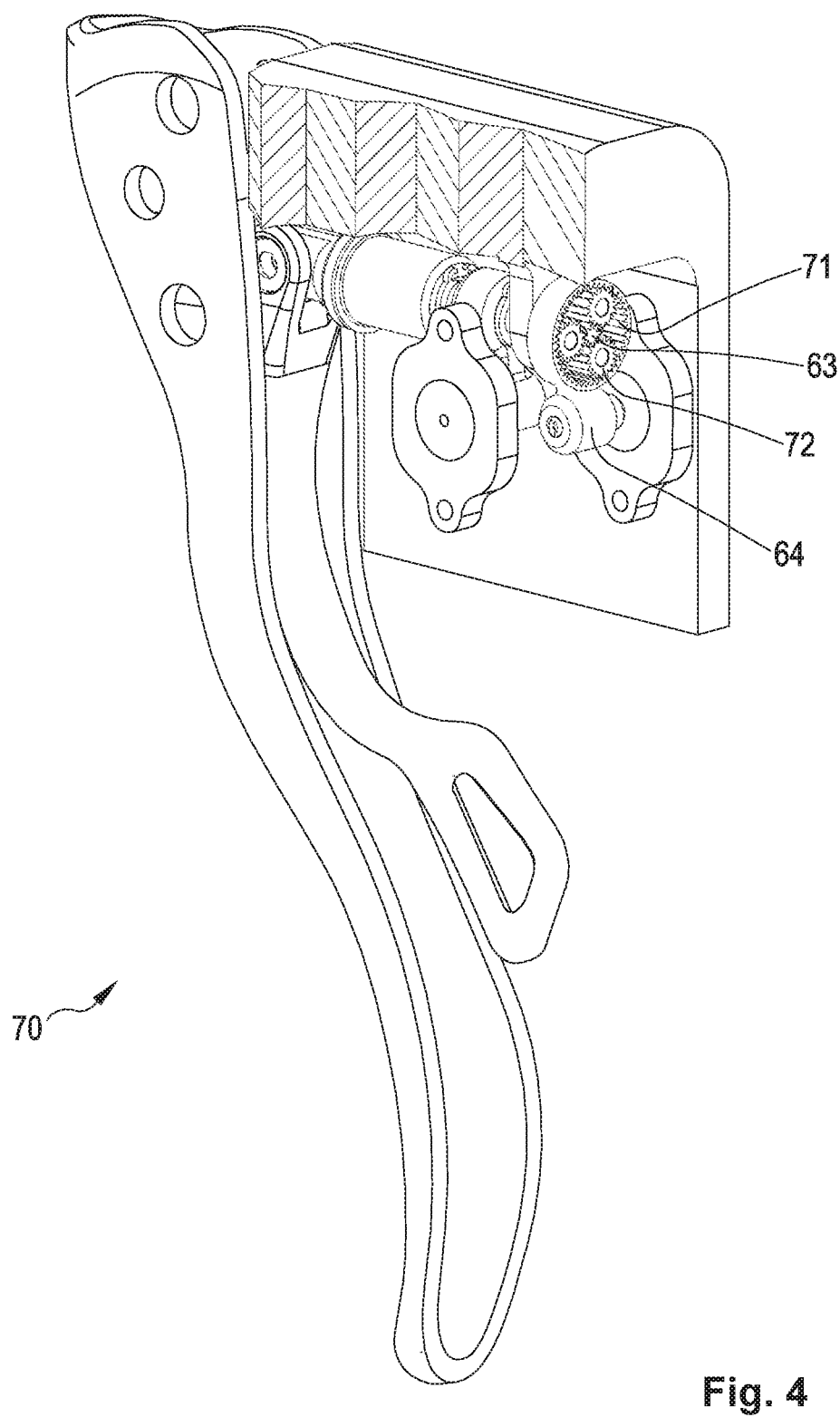

A control device 42 according to an embodiment schematically shown in FIG. 4 and globally indicated therein with reference numeral 70 differs from the control device 50 in that the second hammer 64 is made on an annular gear 71 that is coupled with the first gear wheel 63 through three—or a different number of—planet gears 72 with fixed axis. The operation is equivalent to that of the control device 50 of FIG. 3, but in this case the delay in the actuation of the second switch 61 with respect to the first switch 60 is controlled by the gear ratio of the planetary mechanism.

Figure 5:
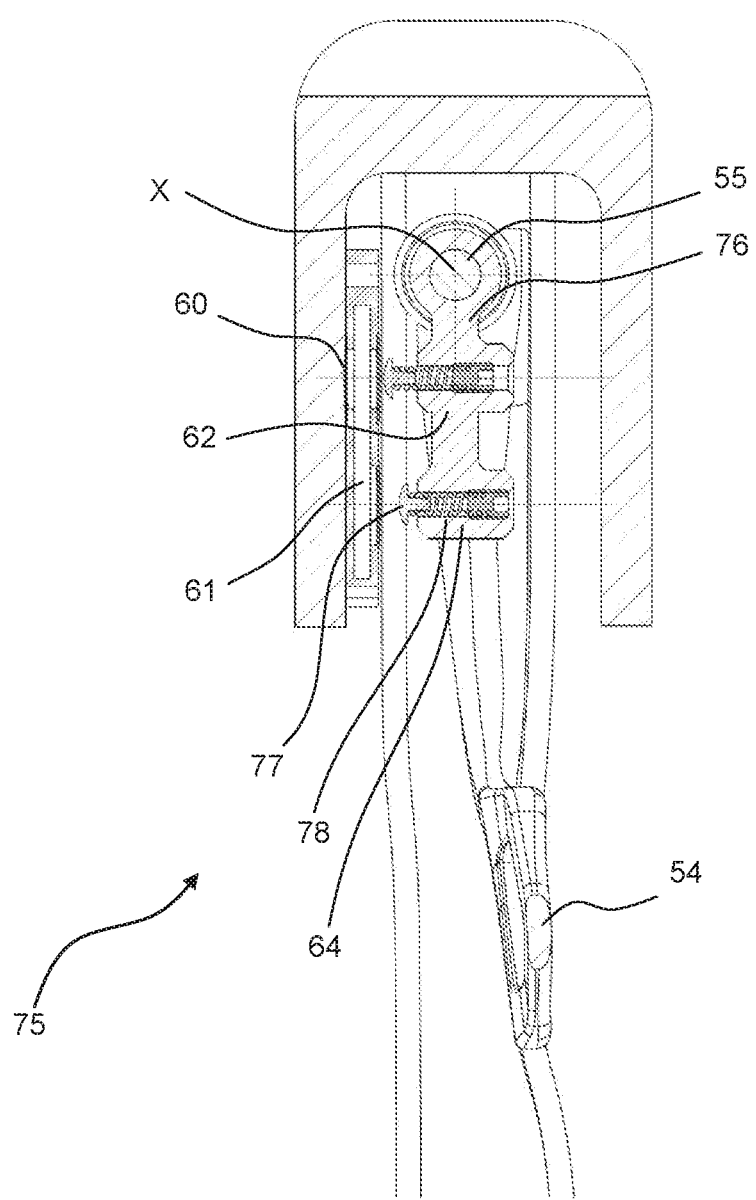

A control device 42 according to an embodiment schematically shown in FIG. 5 and globally indicated therein with reference numeral 75 differs from the control device 50 in that the first and second hammer 62, 64 are made on a same projection 76 fitted onto the shaft 55, at the same radial direction, but at different distances from the rotation axis X of the shaft 55. Also in this case, the first hammer 62 thus actuates the first switch 60 before the second hammer 64 actuates the second switch 61; a greater rotation of the gearshift lever 54 is necessary to also obtain the actuation of the second switch 61 and, upon the release of the gearshift lever 54, the second switch 61, if activated, is deactivated before the first switch 60. It should be noted that the two hammers could be made directly on the gearshift lever 54. The hammers 62, 64 are provided with elastic actuation elements, such as studs 77 inserted into and acting against compression springs 78.

Figure 6:
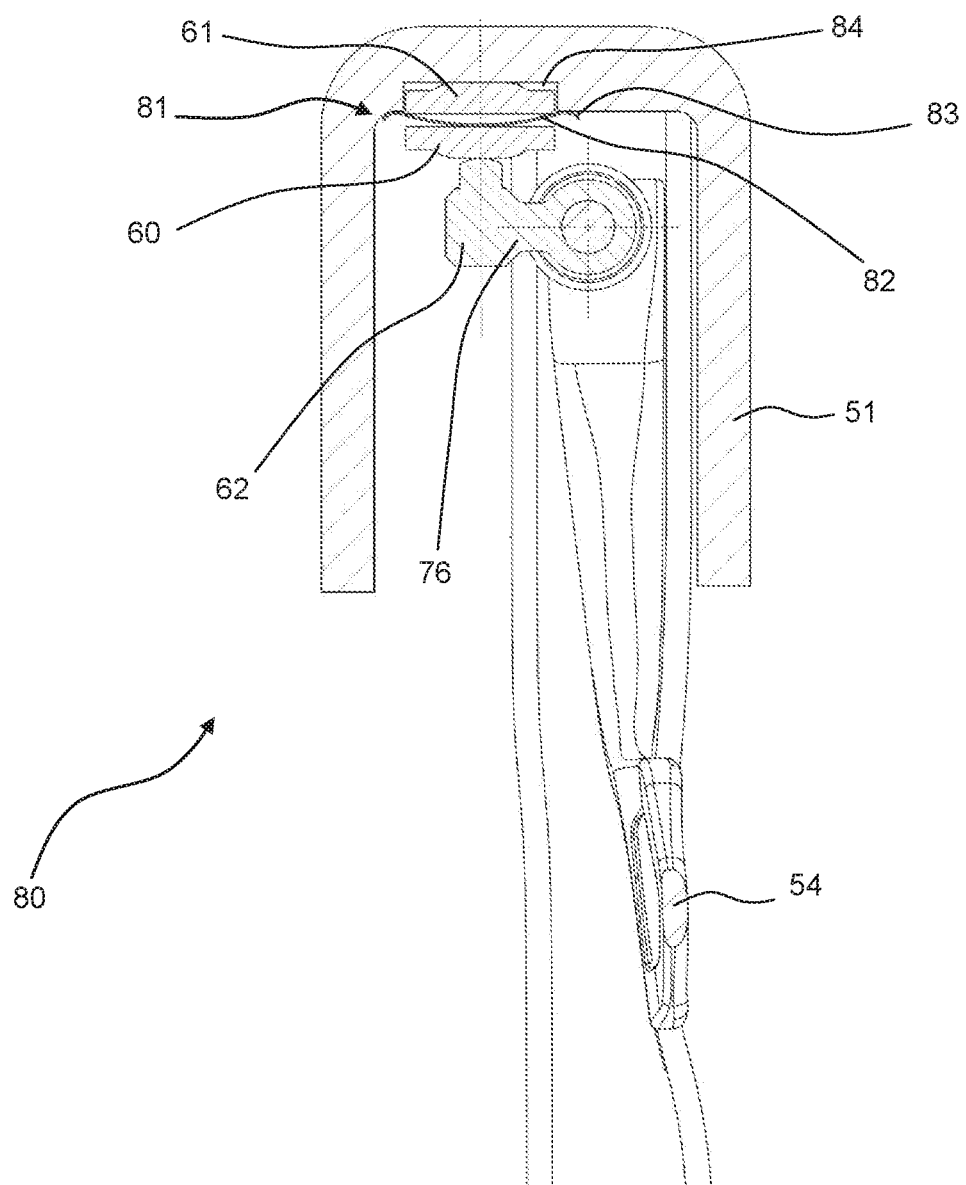

A control device 42 according to an embodiment schematically shown in FIG. 6 and globally indicated therein with reference numeral 80 differs from the control device 50 in that only the first switch 60 is actuated by a first hammer 62. The first switch 60, instead of being directly fixed to the support body 51, is supported on a membrane 81 comprising a spherical cap portion 82 and a rim 83 bent towards the convexity of the portion 82. The membrane 81 is arranged close to a recess 84 of the support body 51. The second switch 61 is partially housed in the recess 84.

The rigidity of the membrane 81 is suitably selected with respect to the rigidity of the switches 60, 61 so that also in this case, when the gearshift lever 54 is rotated by a comparatively small amount, the hammer 62 actuates the first switch 60, while the second switch 61 is not actuated. If the gearshift lever is rotated by a comparatively large amount, after the actuation of the first switch 60, the dome-shaped portion 82 of the membrane 81 collapses and pushes the second switch into the recess 84, causing its activation. Upon the release of the gearshift lever 54, the second switch 62 is deactivated before the first switch 60. It should be noted that the recess 84, the membrane 81 and the switches 60, 61 are shown at an inner face of a top wall of the support body 51, but they could be arranged at a side wall of the support body 51.

Figure 7:
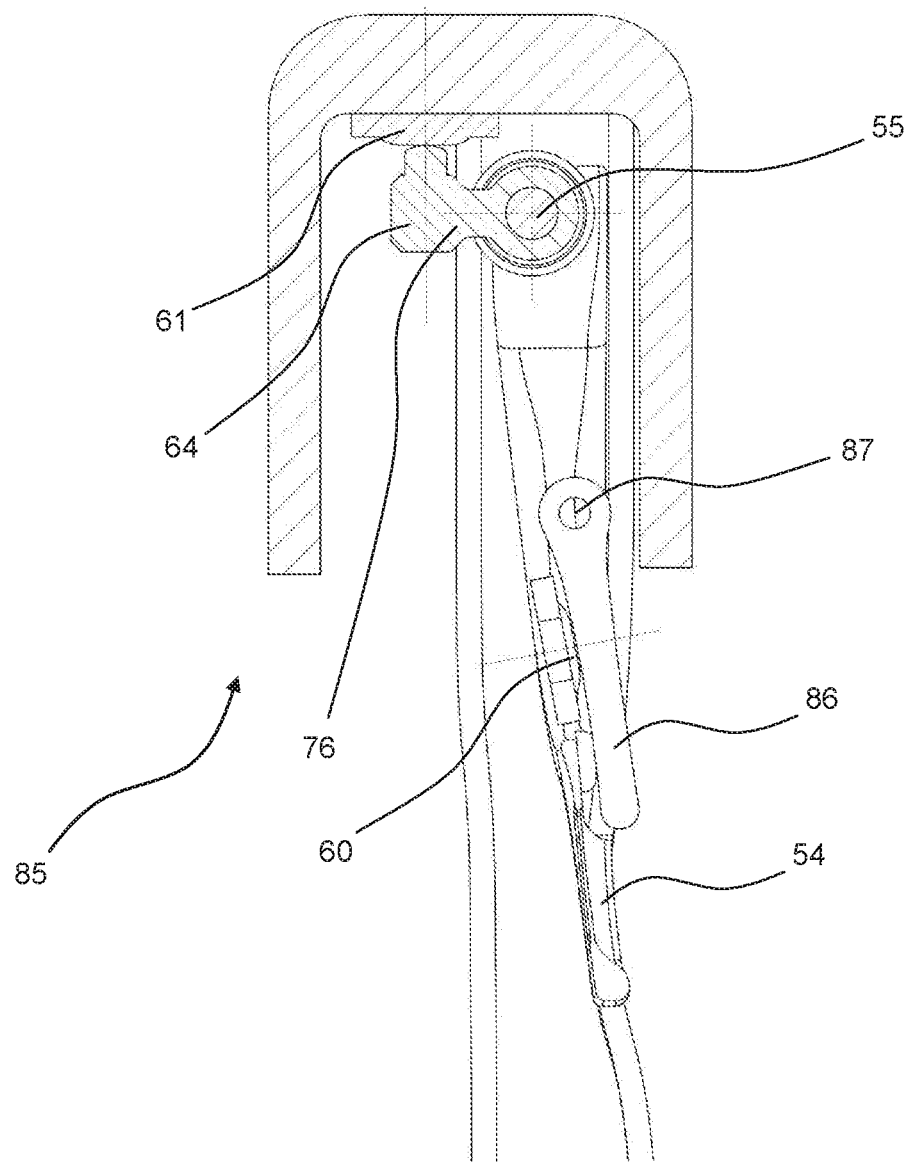

A control device 42 according to an embodiment schematically shown in FIG. 7 and globally indicated therein with reference numeral 85 differs from the control device 50 in that only the second switch 61 is actuated by a hammer 64. The first switch 60, instead of being directly fixed to the support body 51, is supported on the gearshift lever 54 and is actuated by a second gearshift lever 86, pivoted to the first lever 54 about a pin 87 parallel to the shaft 55. The actuation of the second lever 86 by a comparatively small rotation causes the actuation of the first switch 60 and the actuation of the second lever 86 by a comparatively large rotation also causes the actuation of the second switch 61 since the second lever 86 drives the first switch 60 and the first gearshift lever 54 into rotation therewith. It is also possible to provide for the actuation of only the second switch 61 through the direct actuation of the first gearshift lever 54.

In the aforementioned embodiments, the control electronics must distinguish the commands requesting upward gearshifting, associated for example with the first switch 60, from the commands requesting downward gearshifting, associated with the second switch 61 in the example.

Some embodiments of a method for controlling a gearshift are now disclosed, particularly suitable for the above disclosed embodiments of control device.

Figure 8:
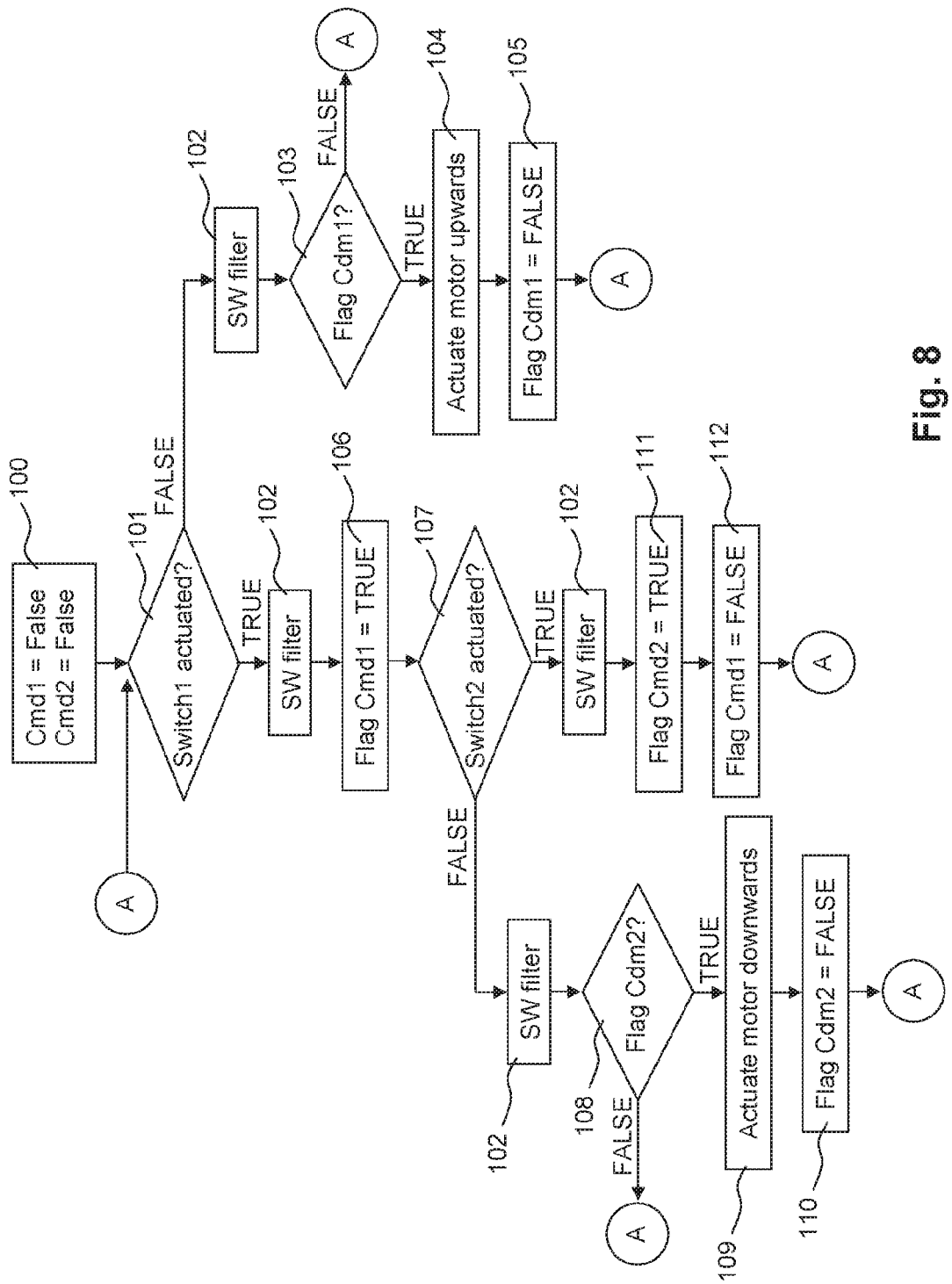
FIG. 8 illustrates an exemplary flow chart of an embodiment of a method for electronically controlling the gearshift according to the invention.

A flow chart of a first embodiment of a method for controlling a bicycle electronic gearshift having two switches 60, 61 actuated in "nested" fashion, like that of FIGS. 3-7, is illustrated in FIG. 8. Under nested actuation, it is meant to indicate that the first switch (i) is actuated alone or (ii) is actuated first and deactivated last, remaining actuated for all the time during which the second switch is actuated.

According to this embodiment the commands requesting upward or downward gearshifting correspond to the deactivation of the buttons, namely to falling edges of the voltage or current signals in the case of normally open switches, driven closed when they are actuated.

In an initialization block 100, carried out for example when the electronic gearshift is switched on, a flag Cmd1, indicative for example of the upward gearshifting command, and a flag Cmd2, indicative for example of the downward gearshifting command, are set to false.

In a block 101 it is firstly monitored whether the first switch 60 is actuated. In the negative case, a filtering subroutine 102 is optionally carried out in which it is checked that the non-actuated state of the switch remains unchanged for a minimum time, to avoid fake deactivations (during an activation) due for example to vibrations or shaking of the cyclist's hand being taken into account. In greater detail, in the filtering subroutine 102, after a change in state of the switch has occurred, a predetermined wait time is waited, for example 5 microseconds (for example a subroutine call is carried out with a wait time preset at a positive value) and the change in state is considered to have validly occurred if during such a time the new state of the switch is maintained, deactivated in this case. If, on the other hand, no change in state has occurred there is no waiting or, respectively, a routine call is carried out with zero wait time. If in the filtering subroutine 102 the predetermined minimum time with the switch in the new state is not passed, execution of block 101 of monitoring the first switch 60 (passage not shown in FIG. 8 for the sake of clarity) is returned to. The same holds true for the other calls of the filtering subroutine 102 described below.

After the filtering subroutine 102, it is checked in a block 103 whether the flag Cmd1 is set to true, and in the negative case the execution of block 101 of monitoring the first switch 60 is returned to. In case the flag Cmd1 is set to true, in a block 104 a request for gearshifting in the direction with which the flag Cmd1 and the first switch 60 are associated is validated, an upward gearshifting request in the example. This validated request starts, elsewhere in the gearshift 8, the motor 16, 17 of the derailleur 14, 15 associated with the control device 42, unless for example the gearshift group 9, 10 is already in the extreme position (toothed wheel 11, 12 of maximum diameter in the example). Thereafter, in a block 105 the flag Cmd1 is set to false and the execution of block 101 of monitoring the first switch 60 is returned to.

In case in block 101 of monitoring the first switch 60 it is found that such a switch is activated, the filtering subroutine 102 described above is optionally carried out to avoid taking spurious activations into account (due for example to vibrations or shaking of the cyclist's hand), and then in a block 106 the flag Cmd1 is set to true.

In a block 107 it is then monitored whether the second switch 61 is actuated. In the negative case, the filtering subroutine 102 is optionally carried out, wherein it is checked that the non-actuated state of the switch has remained unchanged for a minimum time. After the routine 102, it is checked in a block 108 whether the flag Cmd2 is set to true, and in the negative case the execution of block 101 of monitoring the first switch 60 is returned to. In case the flag Cmd2 is set to true, in a block 109 a request for gearshifting in the direction with which the flag Cmd2 and the second switch 61 are associated is validated, a downward gearshifting request in the example. This validated request starts, elsewhere in the gearshift 8, the motor 16, 17 of the derailleur 14, 15 associated with the control device 42, unless for example the gearshift group 9, 10 is already in the extreme position (toothed wheel 11, 12 of minimum diameter in the example). Thereafter, in a block 110 the flag Cmd2 is set to false and execution of block 101 of monitoring the first switch 60 is returned to.

If in block 107 it is found that the second switch 61 is actuated, the filtering subroutine 102 is optionally carried out; thereafter, in a block 111 the flag Cmd2 is set to true, and in a block 112 the flag Cmd1 is set to false to ensure that upon the subsequent deactivation of the first switch 60 the block 104 of actuation of the gearshifting associated therewith is not carried out.

Figure 9:
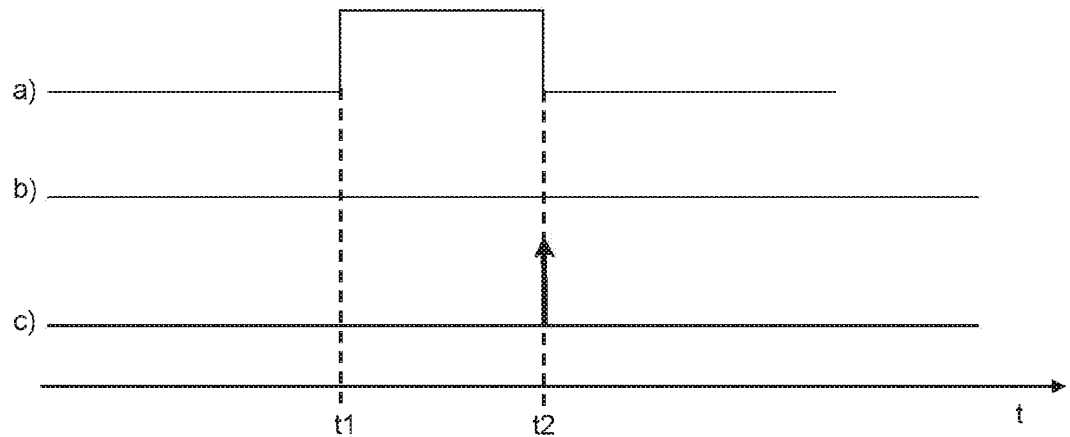
FIGS. 9 and 10 are schematic time charts illustrating the operation of the electronic gearshift controlled according to the flow chart of FIG. 8.

FIG. 9 diagrammatically shows the operation in the case in which the cyclist actuates the gearshift lever 54 by a comparatively small rotation to carry out gearshifting for example upwards. At the beginning, both of the switches 60, 61 will be deactivated so that the routine will cyclically run through blocks 101, 102, 103 and nothing will happen. When the cyclist at time t1 makes the gearshift lever 54 perform the comparatively small rotation, the first switch 60 is activated, but not the second switch 61. The signal relative to the first switch 60, illustrated in (a), passes for example from the low state to the high state. The routine will therefore cyclically run through blocks 101, 102, 106, 107, 102, 108, always setting the flag Cmd1 to true in block 106. When the cyclist releases the lever at time t2, the first switch 60 is deactivated so that the routine runs through blocks 101, 102, 103, 104, 105 since the flag Cmd1 is true. The command requesting upward gearshifting is thus considered valid, which command is carried out in block 104. As symbolized by the upward arrow, the command is validated on the falling edge of the signal corresponding to the first switch 60, in the case of a normally open switch.

Figure 10:
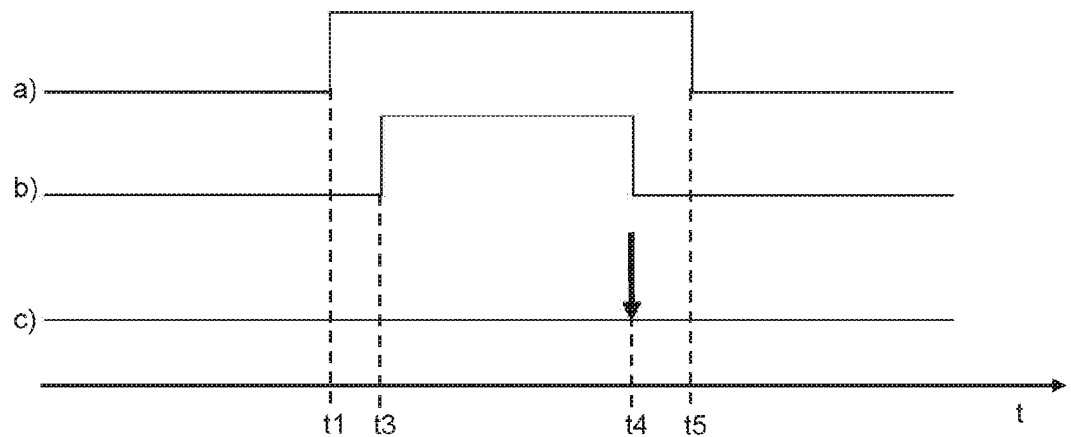

FIG. 10 diagrammatically shows the operation in the case in which the cyclist actuates the gearshift lever 54 by a comparatively large rotation to carry out the gearshifting associated with the second switch 61, for example downward gearshifting. At the beginning, both of the switches 60, 61 will be deactivated so that the routine will cyclically run through blocks 101, 102, 103 and nothing will happen. At time t1, namely as soon as the cyclist has made the gearshift lever 54 perform the comparatively small rotation, the first switch 60 is activated—as illustrated in (a), it passes for example from the low state to the high state—, but not the second switch. The routine will therefore cyclically run through blocks 101, 102, 106, 107, 102, 108, always setting the flag Cmd1 to true in block 106. When at time t3 the cyclist makes the gearshift lever 54 also carry out the comparatively large rotation, the second switch 61 is also activated—as illustrated in (b), it passes for example from the low state to the high state. The routine will therefore cyclically run through blocks 101, 102, 106, 107, 102, 111, 112, always setting the flag Cmd1 to true in block 106, but then setting it to false in block 112. When the cyclist releases the gearshift lever 54, the second switch 61 is deactivated first at time t4, so that the routine runs through blocks 101, 102, 106, 107, 102, 108, 109, 110 since the flag Cmd2 is true. The command requesting downward gearshifting is thus considered valid, which command is carried out in block 109. As symbolized by the downward arrow, the command is validated on the falling edge of the signal corresponding to the second switch 61, in the case of a normally open switch. Thereafter, the routine runs through blocks 101, 102, 106, 107, 102, 108 since the flag Cmd2 has been brought back to false. When at time t5 the first switch 60 also goes back into the normal deactivation state, the routine runs through blocks 101, 102, 103 since the flag Cmd1 had been set to false, therefore ignoring the falling edge of the first switch 60.

Figure 11:
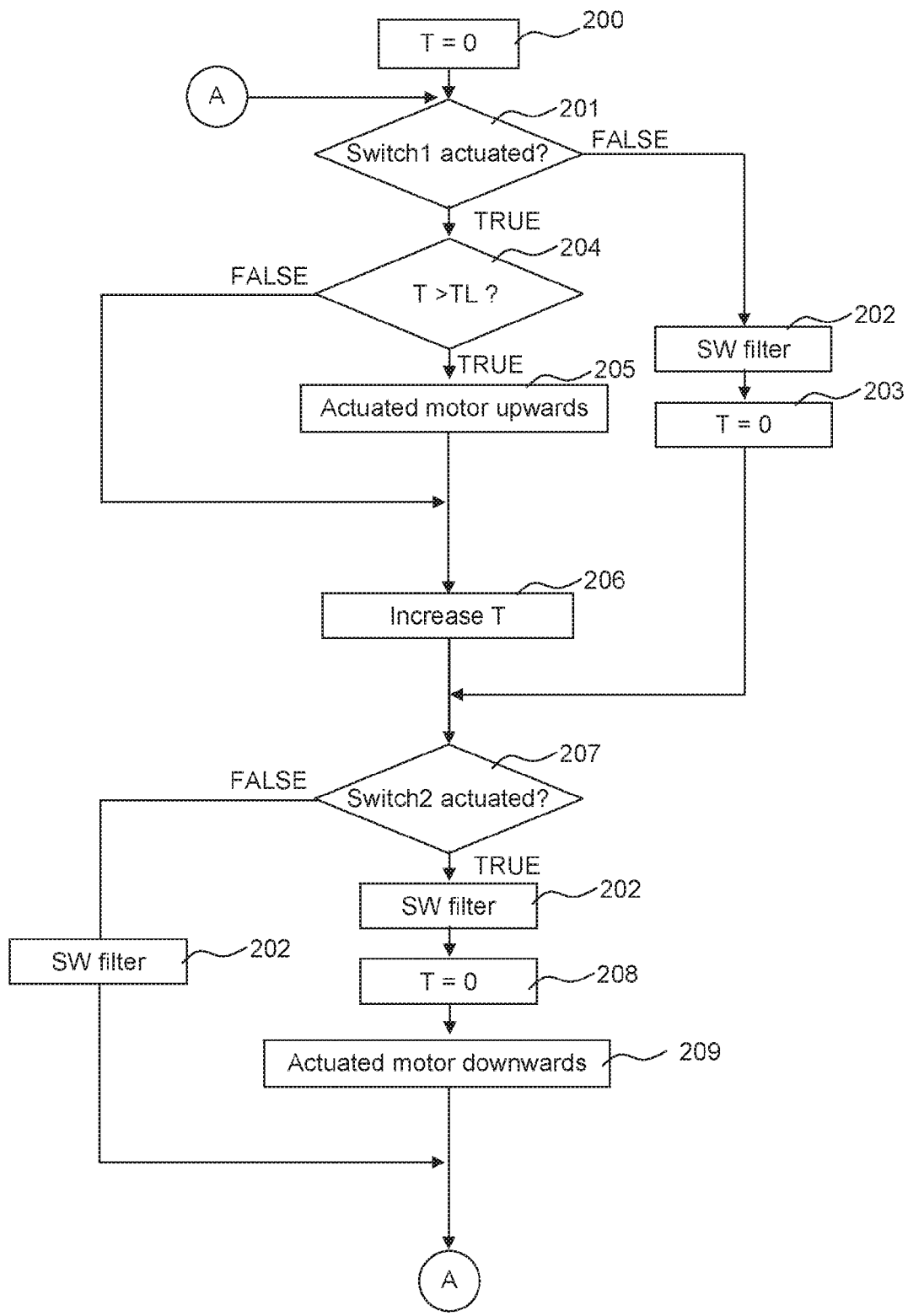
FIG. 11 illustrates an exemplary flow chart of another embodiment of a method for electronically controlling the gearshift according to the invention.

A flow chart of a second embodiment of a method for controlling a bicycle electronic gearshift having two switches 60, 61 actuated in a "nested" manner, like that of FIGS. 3-7, is illustrated in FIG. 11.

According to this embodiment, the validation of the commands requesting upward or downward gearshifting is made earlier than in the first embodiment and precisely it occurs when the second switch is activated or when it is expected that it might be activated, namely at the rising edge or shortly after the rising edge of one of the voltage or current signals in the case of normally open switches, driven closed when they are actuated.

In an initialisation block 200, carried out for example when the electronic gearshift is switched on, a counter T is set to zero.

In a block 201 it is firstly monitored whether the first switch 60 is actuated. In the negative case, a filtering subroutine 202 identical to the routine 102 described above is optionally carried out. If in the filtering subroutine 202 the predetermined minimum time of the switch in the new state has not passed, execution of block 201 of monitoring the first switch is returned to 60. After the filtering subroutine 202, in a block 203 the counter T is brought back to zero. The same holds true for the other calls of the filtering subroutine 202 described below.

In the case in which in block 201 of monitoring the first switch 60 it is found that such a switch is actuated, it is checked in a block 204 whether the value of the counter T exceeds a predetermined value TL. The predetermined value TL is indicative of a maximum time that passes between the activation of the first switch 60 and the activation of the second switch 61 when the cyclist makes the gearshift lever 54 carry out the comparatively large rotation. The predetermined value TL is predetermined with a certain margin to take the situation in which the cyclist slightly dwells upon the gearshift lever 54 into account.

If the check of block 204 has a positive outcome, in a block 205 a request for gearshifting in the direction with which the flag Cmd1 and the first switch 61 are associated is validated, an upward gearshifting request in the example. Thereafter, in a block 206 the counter T is increased. If the check of block 204 has a negative outcome, instead, block 206 of increasing the counter T is directly reached.

After blocks 203 and 206, in a block 207 it is monitored whether the second switch 61 is actuated. In the negative case, the filtering subroutine 202 is optionally carried out and execution of block 201 of monitoring the first switch 60 in returned to.

In the case in which in block 207 of monitoring the second switch 61 it is found that such a switch is activated, the filtering routine 202 is optionally carried out, and in a block 208 the counter T is zeroed, and then in a block 209 a request for gearshifting in the direction with which the second switch 61 is associated is validated, a downward gearshifting request in the example. Thereafter block 201 of monitoring the first switch 60 is returned to.

FIG. 12 diagrammatically shows the operation in the case in which the cyclist actuates the gearshift lever 54 by a comparatively small rotation to carry out a gearshifting, for example upwards. At the beginning, both of the switches 60, 61 will be deactivated so that the routine will cyclically run through blocks 201, 202, 203, 207, 202 and nothing will happen. When at time t1 the cyclist makes the gearshift lever 54 carry out the comparatively small rotation, the first switch 60 is activated, changing state as shown in (a), but the second switch 61 is not activated. The routine will therefore cyclically run through blocks 201, 204, 206, 207, 202 until the time corresponding to the predetermined value TL has passed. When at time t2 the counter T exceeds the predetermined value TL, blocks 201, 204, 205 are carried out. The command requesting upward gearshifting is thus considered valid, which command is carried out in block 205. As symbolized by the upward arrow, the command is validated shortly after the rising edge of the signal corresponding to the first switch 60, in the case of a normally open switch, and actually a time corresponding to the predetermined value TL after such a rising edge. Blocks 206, 207, 202, 201, 204 etc. are then carried out. It can be noted that the command 205 for actuating the motor seems to be carried out plural times, but these are actually multiple calls to a subroutine that is already operating and that is carried out only once.

FIG. 13 diagrammatically shows the operation in the case in which the cyclist actuates the gearshift lever 54 by a comparatively large rotation to carry out gearshifting for example downwards. At the beginning, both of the switches 60, 61 will be deactivated so that the routine will cyclically run through blocks 201, 202, 203, 207, 202 and nothing will happen. At time t1, as soon as the cyclist has made the gearshift lever 54 carry out the comparatively small rotation, the first switch 60 is activated, changing state as shown in (a), but not the second switch. The routine will therefore cyclically run through blocks 201, 204, 206, 207, 202. When at time t2 the cyclist makes the gearshift lever 54 also carry out the comparatively large rotation, the second switch 60 is also activated, which changes state as shown in (b), before the predetermined minimum time TL has passed by assumption. The routine will therefore cyclically run through blocks 201, 204, 206, 207, 202, 208, 209. The command requesting downward gearshifting is thus considered valid, which command is carried out in block 209. As symbolized by the downward arrow, the command is validated on the rising edge of the signal corresponding to the second switch 61, in the case of a normally open switch.

Those skilled in the art will understand that it is possible to provide for normally closed switches, down counters and implementations of the method that are different from those depicted, while still maintaining the described logic.

Also from the mechanical point of view it should be understood that several changes and/or replacements of parts are possible, without departing from the scope of protection of the invention.

The brake lever 52 could in any case be absent—or rather supported in a separate control device—, in the case of a non-integrated control device 42. In this case, it is not necessary for the gearshift lever or levers to be pivoted about two perpendicular axes, since the movement—in one or two opposite directions—to actuate the switch(es) about the shaft 55 is sufficient. However, it is also possible to provide for the other pivot, for example to reduce the danger of the gearshift lever breaking in the case of a collision.

What is claimed is:

1. Device for manually inputting commands for an electronically servo-assisted bicycle gearshift, comprising a lever configured to actuate a first switch when the lever is rotated by a first predetermined angle, and to actuate the first switch and a second switch when the lever is rotated by a second predetermined angle after the rotation by the first predetermined angle.

2. Device according to claim 1, wherein said lever is pivoted on a shaft, a first hammer for actuating the first switch being fitted onto the shaft and projecting at a radial, a second hammer for actuating the second switch being coupled with the shaft through a gear to project at a different radial direction.

3. Device according to claim 2, wherein said gear comprises a pair of gear wheels or a planetary gear.

4. Device according to claim 1, wherein said lever is pivoted on a shaft, a projection is fitted onto the shaft projecting at a radial, and said projection has a first hammer for actuating the first switch a first distance from the shaft and a second hammer for actuating the second switch a second distance from the shaft.

5. Device according to claim 1, wherein said lever is pivoted on a shaft, a projection is fitted on the shaft projecting at a radial and has a first hammer for actuating the first switch, an elastic membrane being arranged between the first switch and the second switch.

6. Device according to claim 1, wherein said lever is pivoted on a second lever, said first switch being fixed on said second lever under said lever to be actuated by the lever, said second lever is pivoted on a shaft, and a projection is fitted onto the shaft projecting at a radial and has a second hammer for actuating the second switch.

7. Device according to claim 1, wherein each of said first and second hammer is equipped with a respective elastic actuation element, preferably comprising a stud received in a compression spring.

8. Electronically servo-assisted bicycle gearshift comprising at least one device for manually inputting commands according to claim 1, and a controller configured to consider a command input requesting gearshifting in a first direction to be valid when only the first switch is actuated, and to consider a command input requesting gearshifting in a second direction to be valid when both of the switches are actuated.

9. Bicycle gearshift according to claim 8, wherein said controller considers a command input requesting gearshifting in the first direction to be valid when the first switch is deactivated without the second switch having been activated, and considers a command input requesting gearshifting in the second direction to be valid when the second switch is deactivated, ignoring the subsequent deactivation of the first switch.

10. Bicycle gearshift according to claim 8, wherein said controller considers a command input requesting gearshifting in the first direction to be valid when the first switch stays activated for a predetermined time period without the second switch having been activated, and considers a command input requesting gearshifting in the second direction to be valid when the second switch is activated after the activation of the first switch, before said predetermined time period has passed.

11. Method for electronically controlling a bicycle gearshift, comprising the steps of:
  a) providing a device for manually inputting commands having a lever configured to actuate a first switch when the lever is rotated by a first predetermined angle, and to actuate the first switch and a second switch when the lever is rotated by a second predetermined angle after the first predetermined angle, and
  b) considering a command input requesting gearshifting in a first direction to be valid when only the first switch is actuated, and considering a command input requesting gearshifting in a second direction to be valid when both of the switches are actuated.

* * * * *